US012275426B2

(12) United States Patent
Nojiri et al.

(10) Patent No.: US 12,275,426 B2
(45) Date of Patent: Apr. 15, 2025

(54) BIOLOGICAL STATE GUIDANCE DEVICE, BIOLOGICAL STATE GUIDANCE METHOD, AND STORAGE MEDIUM

(71) Applicant: HONDA MOTOR CO., LTD., Tokyo (JP)

(72) Inventors: Tsuyoshi Nojiri, Wako (JP); Ryo Kimura, Wako (JP); Hiroko Adachi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 49 days.

(21) Appl. No.: 18/122,201

(22) Filed: Mar. 16, 2023

(65) Prior Publication Data
US 2023/0311926 A1 Oct. 5, 2023

(30) Foreign Application Priority Data

Mar. 31, 2022 (JP) .................. 2022-059086

(51) Int. Cl.
*B60W 50/16* (2020.01)
*B60W 40/08* (2012.01)
(Continued)

(52) U.S. Cl.
CPC ............ *B60W 50/16* (2013.01); *B60W 40/08* (2013.01); *B60W 2040/0827* (2013.01);
(Continued)

(58) Field of Classification Search
CPC .. B60W 50/16; B60W 40/08; B60W 2556/50; B60W 2540/229;
(Continued)

(56) References Cited

U.S. PATENT DOCUMENTS 11,587,461 B2 * 2/2023 Telpaz .................. G06V 20/597
2007/0192038 A1 * 8/2007 Kameyama ........... G06F 16/436
707/E17.143
(Continued)

FOREIGN PATENT DOCUMENTS

JP 2014-511301 5/2014
JP 2016-162109 9/2016
(Continued)

OTHER PUBLICATIONS

Japanese Office Action for Japanese Patent Application No. 2022-059086 mailed Oct. 10, 2023.

*Primary Examiner* — James J Yang
*Assistant Examiner* — Anthony D Afrifa-Kyei
(74) *Attorney, Agent, or Firm* — Amin, Turocy & Watson, LLP

(57) ABSTRACT

A biological state guidance device includes a biological state estimation unit configured to estimate a biological state of an occupant of a vehicle, a target value decision unit configured to decide on a target value that is an index for setting the biological state of the occupant as a target state, a stimulus generation unit configured to control a stimulus generation device for generating a stimulus for guidance so that the biological state of the occupant is close to a target value on the basis of the estimated biological state and the target value, and a position information detection unit configured to detect position information of the vehicle. The target value decision unit decides on the target value on the basis of the position information.

10 Claims, 8 Drawing Sheets

(51) Int. Cl.
*B60W 50/00* (2006.01)
*B60W 50/14* (2020.01)

(52) U.S. Cl.
CPC ............... *B60W 2050/0083* (2013.01); *B60W 2050/143* (2013.01); *B60W 2540/221* (2020.02); *B60W 2540/229* (2020.02); *B60W 2556/50* (2020.02)

(58) Field of Classification Search
CPC ... B60W 2540/221; B60W 2040/0827; B60W 2050/0083; B60W 2050/143; B60W 40/00; B60W 2040/0809; B60W 2040/0818; B60W 2040/0872; B60W 2040/0881; B60W 2040/089; B60W 40/09; B60W 50/10; G08G 1/16; A61B 5/165; A61B 5/00; A61B 5/16; A61B 5/18; A61B 5/4836; A61M 21/00; A61M 2021/0016; A61M 2021/0022; A61M 2021/0027; A61M 2021/0044; A61M 2021/005; A61M 2021/0066; A61M 21/02; A61M 2205/3313; A61M 2205/3561; A61M 2205/3592; A61M 2205/505; A61M 2230/04; A61M 2230/06; A61M 2230/10; A61M 2230/30; A61M 2230/40; A61M 2230/50; A61M 2230/65; G16H 20/70; G16H 40/63

See application file for complete search history.

(56) References Cited

U.S. PATENT DOCUMENTS

| | | | | |
|---|---|---|---|---|
| 2008/0119994 | A1* | 5/2008 | Kameyama | B60W 40/08 701/1 |
| 2021/0016805 | A1* | 1/2021 | Oba | A61B 5/18 |
| 2022/0169257 | A1* | 6/2022 | Kikuta | G08G 1/16 |

FOREIGN PATENT DOCUMENTS

| | | |
|---|---|---|
| JP | 2017-199270 | 11/2017 |
| JP | 2019-214334 | 12/2019 |
| WO | 2012/112300 | 8/2012 |

* cited by examiner

FIG. 2

| DESTINATION | ALERTNESS FLAG | SCHEDULED ARRIVAL TIME |
|---|---|---|
| WORKPLACE | ON | 9:00 |
| HOME | OFF | 20:00 |
| AMUSEMENT PARK | ON | 22:00 |

FIG. 3

| ALERTNESS LEVEL | EXAMPLE OF BIOLOGICAL STATE |
|---|---|
| 0 | DISTRACTED |
| 1 | RELAXATION |
| 2 | NEUTRAL |
| 3 | CONCENTRATION |
| 4 | ALERTNESS |
| 5 | NERVOUS |

BIOLOGICAL STATE GUIDANCE DEVICE, BIOLOGICAL STATE GUIDANCE METHOD, AND STORAGE MEDIUM

CROSS-REFERENCE TO RELATED APPLICATION

Priority is claimed on Japanese Patent Application No. 2022-059086, filed Mar. 31, 2022, the content of which is incorporated herein by reference.

BACKGROUND OF THE INVENTION

Field of the Invention

The present invention relates to a biological state guidance device, a biological state guidance method, and a storage medium.

Description of Related Art

In recent years, efforts to provide access to sustainable transportation systems that take into account vulnerable groups among traffic participants have intensified. In order to implement such systems, research and development to further improve traffic safety and convenience through research and development on preventive safety technology have been mainly performed. With this as a background, for example, Japanese Unexamined Patent Application, First Publication No. 2019-214334 discloses technology for detecting an activation degree of the brain of a vehicle occupant, and when it is determined that the activation degree is not in an appropriate state, guiding the occupant from a current heart rate to a target heart rate by sound or vibration so that an activation state is optimized.

SUMMARY OF THE INVENTION

In relation to the preventive safety technology, in the related art, it is possible to optimize an activation state by applying a heartbeat guidance stimulus according to a current activation state of an occupant. However, an optimal biological state of the occupant may differ according to a situation.

Aspects of the present invention have been made in consideration of such circumstances and an objective of the present invention is to provide a biological state guidance device, a biological state guidance method, and a storage medium for guiding an occupant to have biological states suitable for various situations and contributing to the development of a sustainable transportation system.

In order to achieve the objective for solving the above-described problems, the present invention adopts the following aspects.

(1): According to an aspect of the present invention, there is provided a biological state guidance device including: a biological state estimation unit configured to estimate a biological state of an occupant of a vehicle; a target value decision unit configured to decide on a target value that is an index for setting the biological state of the occupant as a target state; a stimulus generation unit configured to control a stimulus generation device for generating a stimulus for guidance so that the biological state of the occupant is close to a target value on the basis of the estimated biological state and the target value; and a position information detection unit configured to detect position information of the vehicle, wherein the target value decision unit decides on the target value on the basis of the position information.

(2): In the above-described aspect (1), the biological state guidance device may further include a destination information acquisition unit configured to acquire destination information about a destination of the vehicle, wherein the target value decision unit may change the target value in accordance with a distance based on the destination information and the position information.

(3): In the above-described aspect (2), the destination information may include an attribute corresponding to the destination, and the target value decision unit may change the target value in accordance with the attribute.

(4): In any one of the above-described aspects (1) to (3), the target value decision unit may change the target value on the basis of time information.

(5): In any one of the above-described aspects (1) to (4), the biological state guidance device may further include a proficiency level decision unit configured to decide on a proficiency level for driving of a driver among occupants, wherein the target value decision unit may change the target value on the basis of the proficiency level.

(6): In any one of the above-described aspects (1) to (5), the biological state guidance device may further include a traveling state storage unit configured to store a traveling state of a certain period, wherein the target value decision unit may change the target value on the basis of the traveling state.

(7): In any one of the above-described aspects (1) to (6), the biological state guidance device may further include a date information acquisition unit configured to acquire date or day-of-week information, wherein the target value decision unit may change the target value on the basis of the date or day-of-week information.

(8): In any one of the above-described aspects (1) to (7), the biological state guidance device may further include a fatigue level estimation unit configured to estimate a fatigue level of the occupant, wherein the target value decision unit may change the target value on the basis of the fatigue level.

(9): According to an aspect of the present invention, there is provided a biological state guidance method including: detecting, by an in-vehicle computer, position information of a vehicle; estimating, by the in-vehicle computer, a biological state of an occupant of the vehicle; deciding, by the in-vehicle computer, on a target value that is an index for setting the biological state of the occupant as a target state on the basis of the position information; and controlling, by the in-vehicle computer, a stimulus generation device for generating a stimulus for guidance so that the biological state of the occupant is close to a target value on the basis of the estimated biological state and the target value.

(10): According to an aspect of the present invention, there is provided a storage medium storing a program for causing an in-vehicle computer to: detect position information of a vehicle; estimate a biological state of an occupant of the vehicle; decide on a target value that is an index for setting the biological state of the occupant as a target state on the basis of the position information; and control a stimulus generation device for generating a stimulus for guidance so that the biological state of the occupant is close to a target value on the basis of the estimated biological state and the target value.

According to the above-described aspects (1), (9), and (10), it is possible to guide the occupant to have a biological state suitable for a host vehicle position because a suitable biological state may differ in accordance with the host vehicle position.

According to the above-described aspect (2), it is possible to smoothly guide the occupant to have a biological state until a destination is reached because the biological state is changed according to a distance between the destination and the host vehicle position.

According to the above-described aspect (3), it is possible to guide the occupant to have a suitable biological state for each destination according to an attribute because an ideal biological state at the time of arrival may differ according to the destination.

According to the above-described aspect (4), it is possible to guide the occupant to have a suitable biological state at each time because an ideal biological state at the time of arrival may differ according to a current time or an expected arrival time of arrival at the destination.

According to the above-described aspect (5), it is possible to guide the occupant to have a suitable biological state even if the driver is a beginner because there may be more nervous situations when the driver is a beginner than when the driver is a normal driver.

According to the above-described aspect (6), the present biological state may be estimated in more detail from the past traveling state and guidance for the biological state can be provided more effectively.

According to the above-described aspect (7), because the ideal biological state may differ according to a date and day of the week even with the same position information, it is possible to guide the occupant to have a more appropriate biological state.

According to the above-described aspect (8), because the occupant easily falls into distracted driving in a fatigued state, it is possible to guide the occupant to have a suitable biological state in which the fatigue level is taken into account.

BRIEF DESCRIPTION OF THE DRAWINGS

FIG. 2 is a diagram showing a specific example of destination information.

FIG. 3 is a figure showing a specific example of an alertness level.

DETAILED DESCRIPTION OF THE INVENTION

Hereinafter, embodiments of a biological state guidance device, a biological state guidance method, and a storage medium of the present invention will be described.

First Embodiment

<Vehicle System>

Figure 1:
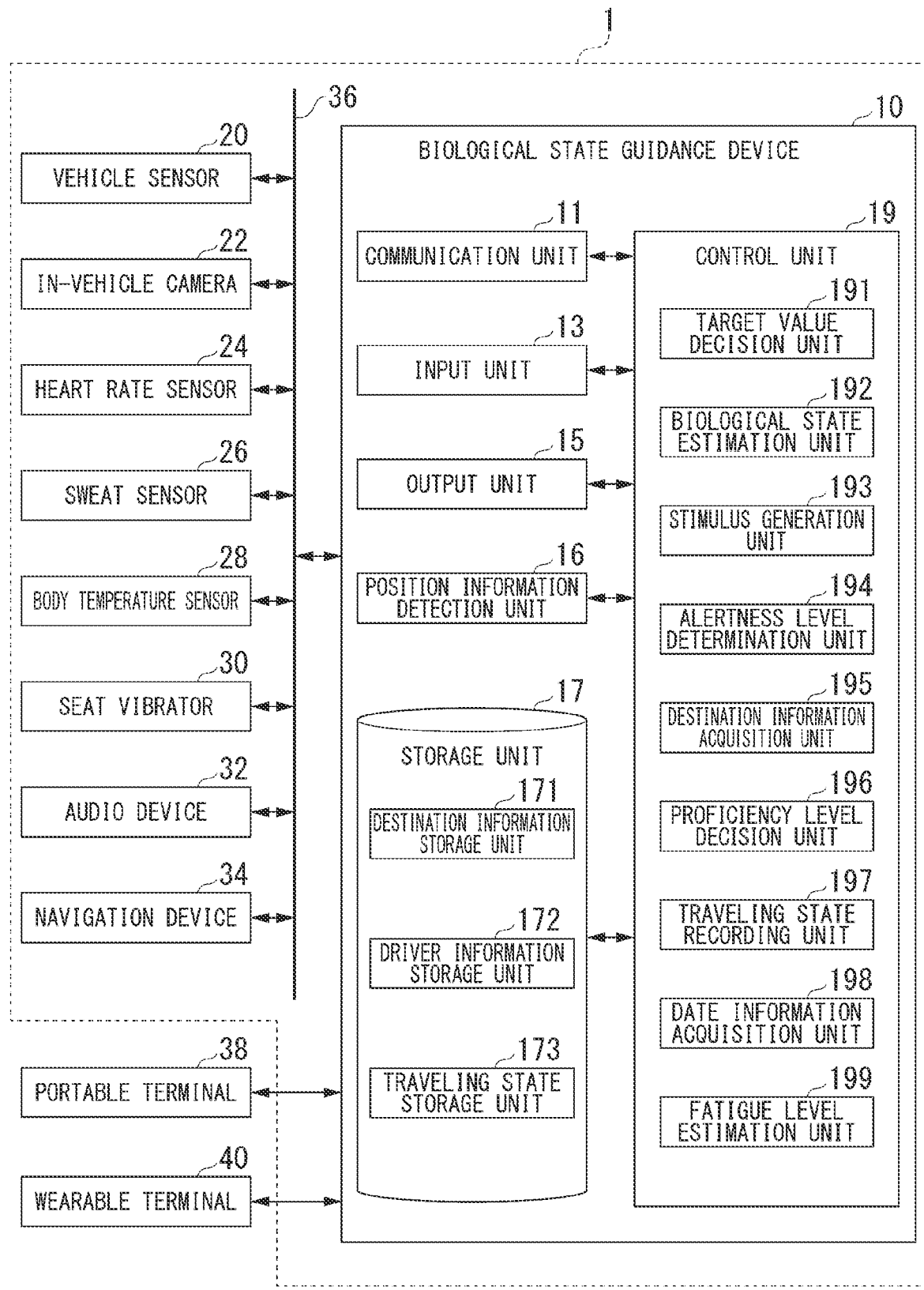
FIG. 1 is a schematic block diagram showing a system configuration of a vehicle system in which a biological state guidance device is mounted.

FIG. 1 is a configuration diagram of a vehicle system 1 in which a biological state guidance device 10 according to an embodiment is mounted. A vehicle in which the vehicle system 1 is mounted (hereinafter referred to as a host vehicle M) is, for example, a vehicle such as a two-wheeled vehicle, a three-wheeled vehicle, or a four-wheeled vehicle, and a drive source thereof is an internal combustion engine such as a diesel engine or a gasoline engine, an electric motor, or a combination thereof. When an electric motor is provided, the electric motor operates using electric power generated by a power generation unit connected to the internal combustion engine or electric power that is supplied when a secondary battery or a fuel cell is discharged. Although not shown, the vehicle in which the vehicle system 1 is mounted includes driving operation element units such as an accelerator pedal, a brake pedal, and a steering wheel provided in a normal vehicle, a travel driving force output device, a brake device, a steering device, and a control unit.

The vehicle system 1 includes, for example, a biological state guidance device 10, a vehicle sensor 20, an in-vehicle camera 22, a heart rate sensor 24, a sweat sensor 26, a body temperature sensor 28, a seat vibrator 30, an audio device 32, and a navigation device 34. An occupant of the vehicle in which the vehicle system 1 is mounted holds, for example, a portable terminal (smartphone) 38 and a wearable terminal 40. Such devices and equipment are connected to each other by a multiplex communication line such as a controller area network (CAN) communication line, a serial communication line, or a wireless communication network (hereinafter simply referred to as an in-vehicle network 36). The configuration shown in FIG. 1 is merely an example and some of the components may be omitted or other components may be further added.

The vehicle sensor 20 includes a vehicle speed sensor configured to detect the speed of the host vehicle M, an acceleration sensor configured to detect acceleration, a gyro sensor configured to detect an angular velocity, a direction sensor configured to detect a direction of the host vehicle M, and the like. The vehicle sensor 20 may detect a magnitude of vibration received from a road surface on which the host vehicle M is traveling (not shown).

Although not shown, the vehicle sensor 20 may include an operation element sensor such as an accelerator opening degree sensor, a brake sensor, a steering sensor, or a grip sensor provided in a driving operation element unit. The accelerator opening degree sensor detects an operation amount of the accelerator pedal (an accelerator opening degree). The brake sensor detects the operation amount of the brake pedal. The brake sensor detects a depression amount of a brake pedal on the basis of, for example, a change in the brake pedal or the hydraulic pressure of the master cylinder of the brake device. The steering sensor detects the operation amount of the steering wheel. The steering sensor is provided, for example, on a steering shaft and detects the operation amount of the steering wheel on the basis of a rotation angle of the steering shaft. The steering sensor may detect the steering torque and detect the operation amount of the steering wheel on the basis of the detected steering torque. The grip sensor is, for example, a capacitive sensor provided in a circumferential direction of the steering wheel. The grip sensor detects that a physical object (the occupant's hand) has come into contact with an area of a detection target as a change in capacitance. These vehicle sensors 20 transmit the acquired sensor information to the biological state guidance device 10 via the in-vehicle network 36.

The in-vehicle camera 22 is a digital camera using, for example, a solid-state imaging sensor such as a charge-coupled device (CCD) or a complementary metal oxide semiconductor (CMOS). The in-vehicle camera 22 is attached at a position where an occupant of the host vehicle M (for example, an occupant sitting in the driver's seat is hereinafter referred to as a driver and an occupant sitting in a passenger seat or a rear seat is referred to as a fellow passenger) can be imaged. The in-vehicle camera 22 images, for example, an imaging target area, at prescribed intervals and transmits a captured image to the biological state guidance device 10 via the in-vehicle network 36. The in-vehicle camera 22 may be a stereo camera.

The heart rate sensor 24 detects the occupant's heart rate as the biological state. The heart rate sensor 24 may be, for example, a heart rate sensor provided on a steering wheel, millimeter-wave radar in the cabin, a pressure sensor provided on the seat belt, or a heart rate sensor or an ultrasonic sensor provided on a child seat. The heart rate sensor 24 transmits an electrical signal corresponding to the occupant's detected heart rate to the biological state guidance device 10 via the in-vehicle network 36.

The sweat sensor 26 detects an amount of sweat of the occupant as a biological state. The sweat sensor 26 is provided, for example, on the steering wheel, and detects the amount of sweat when the occupant grips the steering wheel while driving. The sweat sensor 26 transmits an electrical signal corresponding to the detected amount of sweat of the occupant to the biological state guidance device 10 via the in-vehicle network 36.

The body temperature sensor 28 detects the body temperature of the occupant as the biological state. The body temperature sensor 28 may be, for example, a thermal camera provided in the cabin. The body temperature sensor 28 transmits an electrical signal corresponding to the detected body temperature of the occupant to the biological state guidance device 10 via the in-vehicle network 36.

The seat vibrator 30 is provided in a part of the seat of the host vehicle M (a seat cushion that supports the buttocks and thighs of the occupant, a seat back that supports the waist and back of the occupant, a headrest that supports the head and neck of the occupant, or the like). The seat vibrator 30 vibrates the seat by generating vibrations according to an electrical signal received via the in-vehicle network 36.

The audio device (car stereo) 32 includes, for example, an operation unit, a media holding unit, a playback unit, and a modulation unit, and stores music information in a storage device such as a hard disk drive (HDD) or a flash memory. Although not shown, the audio device 32 is connected to an external speaker. The audio device 32 plays music information stored in the storage device or music information of media held in the media holding unit according to an operation of the occupant from the operation unit or a control signal from the biological state guidance device 10 via the in-vehicle network 36 and outputs the music information to an external speaker. The audio device can change a beats per minute (BPM) rate and pitch of music information by the modulation unit and play the music information. The audio device 32 may acquire music information from an external server via a communication device mounted in the vehicle.

Although not shown, the navigation device 34 includes, for example, a global navigation satellite system (GNSS) receiver, a navigation human machine interface (HMI), and a route decision unit and holds map information in a storage device such as a hard disk drive (HDD) or a flash memory. The GNSS receiver identifies a position of the host vehicle M on the basis of a signal received from a GNSS satellite. The position of the host vehicle M may be identified or corrected by an inertial navigation system (INS) using an output of the vehicle sensor 20. The navigation HMI includes a display device, a speaker, a touch panel, a key, and the like. For example, the route decision unit decides on a route from the position of the host vehicle M identified by the GNSS receiver (or any input position) to a destination input by the occupant (hereinafter referred to as a route on a map) using the navigation HMI with reference to the map information. The map information is, for example, information in which a road shape is expressed by a link indicating a road and nodes connected by the link. The map information may include curvature of a road, point of interest (POI) information, and the like. The navigation device 34 may provide route guidance using the navigation HMI on the basis of the route on the map decided on by the route decision unit. The position information of the host vehicle M identified by the GNSS receiver, information about the destination input by the occupant, and information about the route on the map decided on by the route decision unit are output to the biological state guidance device 10 or the like via the in-vehicle network 36.

The navigation device 34 may be implemented by, for example, a function of a terminal device such as a smartphone or a tablet terminal owned by an occupant. The navigation device 34 may transmit the current position and the destination to the navigation server via the communication device mounted in the vehicle and acquire the route on the map returned from the navigation server.

The vehicle system 1 may include a GNSS receiver (GPS receiver) separate from the navigation device 34 and acquire position information of the host vehicle M.

The portable terminal (smartphone) 38 includes, for example, a central processing unit (CPU), a random-access memory (RAM), a read-only memory (ROM), an auxiliary storage unit including a flash memory, a communication unit, a display unit, an input unit, and various types of sensors. In the portable terminal 38, the CPU reads various types of programs stored in the auxiliary storage unit or the like into the RAM and executes the programs, such that the programs perform intended functions. The portable terminal 38 communicates with the biological state guidance device 10 via wireless communication, and transmits, for example, various types of information of the occupant who is the owner of the portable terminal 38 and information acquired from various types of sensors. The portable terminal 38 may play the roles of various vehicle sensors 20, the audio device 32, and the navigation device 34 of the vehicle system 1.

The wearable terminal 40 includes, for example, a wristwatch-type portable terminal, and includes a CPU, a RAM, a ROM, an auxiliary storage unit including a flash memory, a communication unit, a display unit, an input unit, and various types of sensors. In the wearable terminal 40, the CPU reads various types of programs stored in the auxiliary storage unit or the like into the RAM and executes the programs, such that the programs perform intended functions. The wearable terminal 40 communicates with the biological state guidance device 10 via wireless communication, and transmits, for example, various types of information of the occupant who is the owner of the wearable terminal 40 and information acquired from various types of sensors. The wearable terminal 40 may play the roles of various types of vehicle sensors 20, the heart rate sensor 24, the sweat sensor 26, the body temperature sensor 28, the audio device 32, and the navigation device 34 in the vehicle system 1.

<<Biological State Guidance Device>>

Next, the biological state guidance device 10 will be described in detail. The biological state guidance device 10 is an information processing device capable of communication, for example, an in-vehicle computer. The biological state guidance device 10 includes a communication unit 11, an input unit 13, an output unit 15, a position information detection unit 16, a storage unit 17, and a control unit 19.

The communication unit 11 is a communication device. The communication unit 11 communicates with other equipment and devices via the in-vehicle network 36. Also, the communication unit 11 communicates with the portable terminal 38 and the wearable terminal 40 via wireless communication.

The input unit 13 is an input device such as a button or a touch panel. The input unit 13 is operated by the occupant when the occupant's instructions are input to the biological state guidance device 10. The input unit 13 may be an interface for connecting the input device to the biological state guidance device 10. In this case, the input unit 13 inputs an input signal generated in response to the input of the occupant in the input device to the biological state guidance device 10. The biological state guidance device 10 may use the portable terminal 38 or the wearable terminal 40 as an input device. In this case, the communication unit 11 (or the input unit 13) inputs an input signal generated in response to the input of the occupant in these terminals to the biological state guidance device 10.

The output unit 15 may be, for example, an image display device such as a liquid crystal display or an organic electroluminescent (EL) display. The output unit 15 may provide an output to an external speaker connected to the audio device 32. In this case, the output signal is output to the audio device 32 via the communication unit 11 (or the output unit 15). The output unit 15 outputs information to the occupant.

The input unit 13 and the output unit 15 may be configured as an integrated touch panel display.

The position information detection unit 16 detects (acquires) position information indicating a current position of the biological state guidance device 10 (the host vehicle M). The position information detection unit 16 may be configured using, for example, a Global Positioning System (GPS) receiver. The position information detection unit 16 may be configured to detect position information on the basis of, for example, reception strengths of signals received from a plurality of base stations of mobile communication. In this case, some of the functions of the position information detection unit 16 may be implemented in the control unit 19. The biological state guidance device 10 may acquire position information indicating the current position from the navigation device 34, the GNSS receiver (GPS receiver) provided in the vehicle system 1, the portable terminal 38, and the wearable terminal 40.

The storage unit 17 is a storage device such as a magnetic hard disk device or a semiconductor storage device. The storage unit 17 stores information necessary for a process of the control unit 19. The storage unit 17 includes at least a destination information storage unit 171, a driver information storage unit 172, and a traveling state storage unit 173.

The destination information storage unit 171 stores information about the destination. As shown in FIG. 2, the destination information storage unit 171 stores, for example, a "destination," an "alertness flag," and a "scheduled arrival time" as the destination information 201. The "destination" is a destination of the host vehicle M. The "destination" includes a name of the destination and its position information. The "alertness flag" is a flag indicating whether or not the occupant is active (whether or not the occupant is alerted) at the time of arrival at the destination, and has, for example, an ON/OFF value. The "scheduled arrival time" is a scheduled time of arrival at the destination. The information may be input by the occupant from the input unit 13. The information of the "destination" and the "scheduled arrival time" may be acquired by the biological state guidance device 10 from the navigation device 34. The "alertness flag" may be automatically set by the biological state guidance device 10 from the destination.

The driver information storage unit 172 stores information about the driver. The driver information storage unit 172 stores, for example, information of whether or not the driver is a driving beginner, position information of the driver's home, position information of the driver's workplace, and the like. The driver information storage unit 172 may store information acquired by the biological state guidance device 10 from the portable terminal 38 or the wearable terminal 40. Such information is, for example, information about the driver's calendar such as work days and holidays, and information of the driver's recent sleep data. The driver information storage unit 172 may store information of the driver's driving time acquired by the biological state guidance device 10 from the navigation device 34 or the like.

The traveling state storage unit 173 stores information about the traveling state. The traveling state storage unit 173 stores, for example, information of the vehicle sensor 20 and information of a movement trajectory for a prescribed period of time. The information of the vehicle sensor 20 is information such as a speed, acceleration, a yaw rate, an accelerator opening degree, a brake operation amount, a steering wheel operation amount, a correction steering angle, and a steering angle speed acquired from the vehicle sensor 20 by the biological state guidance device 10. The movement trajectory information is information indicating a change over time in the position of the host vehicle M acquired by the biological state guidance device 10 from the position information detection unit 16, the navigation device 34, or the like.

The control unit 19 is a processor such as a CPU and a memory. The control unit 19 functions as a target value decision unit 191, a biological state estimation unit 192, a stimulus generation unit 193, an alertness level determination unit 194, a destination information acquisition unit 195, a proficiency level decision unit 196, a traveling state recording unit 197, a date information acquisition unit 198, and a fatigue level estimation unit 199 when the processor executes a program. All or some of the functions of the control unit 19 may be implemented using hardware such as an application-specific integrated circuit (ASIC), a programmable logic device (PLD), or a field-programmable gate array (FPGA). The above program may be recorded on a computer-readable recording medium. Computer-readable recording media include, for example, a portable medium such as a flexible disk, a magneto-optical disk, a ROM, a compact disc (CD)-ROM, or a semiconductor storage device (for example, a solid-state drive (SSD)) and a storage device such as a hard disk and a semiconductor storage device built into computer systems. The above-described program may be transmitted via a telecommunication circuit.

The target value decision unit 191 decides on a target value of an alertness level related to the driver's biological state. FIG. 3 is a diagram showing an example of an alertness level 301. The "alertness level" is classified into six levels, for example, "0," "1," "2," "3," "4," and "5," which correspond to "distracted," "relaxation," "neutral," "concentration," "alertness," and "nervous" of the "biological state," respectively. In the example of the alertness level 301, the "biological state" is closer to "distracted" when the "alertness level" is lower and the "biological state" is closer to "nervous" when the "alertness level" is higher. The target value decision unit 191 decides on a target value of an alertness level related to the biological state of the driver in accordance with various situations such as information of a distance to the destination acquired by the biological state estimation unit 192, destination information 201 (FIG. 2), information about the driver, information about the traveling state, information about the driver's calendar, and information about the driver's fatigue (recent sleep data and driving time information). For example, the target value decision unit 191 may set the target value of the alertness level to "2" corresponding to "neutral." Specifically, this will be described below with reference to FIGS. 4 to 9.

The biological state estimation unit 192 estimates the alertness level related to the biological state of the driver (hereinafter also referred to as the driver's alertness level) on the basis of information acquired from various types of sensors (20, 24, 26, and 28) and the in-vehicle camera 22. The estimated alertness level uses the same index as the alertness level 301 shown in FIG. 3. For example, the biological state estimation unit 192 acquires the driver's heart rate from the heart rate sensor 24, classifies the heart rate into six levels, and estimates the alertness level corresponding thereto. Also, for example, the biological state estimation unit 192 acquires the driver's sweat amount from the sweat sensor 26, classifies the sweat amount into six levels, and estimates the alertness level corresponding thereto. Also, for example, the biological state estimation unit 192 acquires the driver's body temperature from the body temperature sensor 28, classifies the body temperature into six levels, and estimates the alertness level corresponding thereto. For example, the biological state estimation unit 192 obtains eye movement information from the driver's image acquired from the in-vehicle camera 22, classifies the eye movement amount into six levels, and estimates the alertness level corresponding thereto.

Also, for example, the biological state estimation unit 192 acquires information such as the speed and acceleration of the host vehicle M, a yaw rate, an accelerator opening degree, a brake operation amount, a steering wheel operation amount, a correction steering angle, and a steering angle speed from the vehicle sensor 20, classifies the information into six levels, and estimates the alertness level corresponding thereto. The information from the vehicle sensor 20 is not information about the driver's biological state, but is information regarded as being related to the driver's biological state.

The biological state estimation unit 192 may estimate the driver's alertness level on the basis of a plurality of estimated alertness levels. For example, the biological state estimation unit 192 may estimate the driver's alertness level by taking an average value of a plurality of alertness levels or weighting them. The biological state estimation unit 192 may acquire information of the heart rate, the sweat amount, and the body temperature from the wearable terminal 40.

The stimulus generation unit 193 generates a stimulus for guidance (hereinafter also referred to as a guidance stimulus) so that the driver's alertness level estimated by the biological state estimation unit 192 is close to the target value of the alertness level decided on by the target value decision unit 191. Specifically, the stimulus generation unit 193 generates a stimulus for alerting the driver (hereinafter also referred to as an alertness stimulus) when the driver's alertness level is less than the target value. The stimulus generation unit 193 generates a stimulus for relaxing the driver (hereinafter also referred to as a relaxation stimulus) when the driver's alertness level is higher than the target value). The stimulus generation unit 193 does nothing when the driver's alertness level is the same as the target value.

As a stimulus, for example, the stimulus generation unit 193 may cause the audio device 32 to play effective BPM music by transmitting a signal to the audio device 32 or play currently playing music by modulating the currently playing music (changing a playback pitch). As an alertness stimulus, for example, the stimulus generation unit 193 causes the audio device 32 to play music having a high BPM rate or to play music with a BPM rate or a pitch increased by a prescribed percentage in accordance with a difference between the target value and the current alertness level. As a relaxation stimulus, the stimulus generation unit 193 causes the audio device 32 to play music having a low BPM rate or to play music with a BPM rate or a pitch decreased by a prescribed percentage in accordance with a difference between the target value and the current alertness level. For example, when a heart rate is used as the alertness level, the stimulus generation unit 193 may cause the audio device 32 to play music with a BPM rate or a pitch increased by a prescribed percentage in the alertness stimulus or with a BPM rate or a pitch decreased by a prescribed percentage in the relaxation stimulus on the basis of a heart rate at the normal time or the current time. Likewise, the stimulus generation unit 193 may cause music to be played by transmitting a control signal to the portable terminal 38 or the wearable terminal 40 instead of the audio device 32.

As a stimulus, the stimulus generation unit 193 may vibrate the seat, for example, by causing the seat vibrator 30 to perform a vibration process at effective intervals. As an alertness stimulus, for example, the stimulus generation unit 193 causes the seat vibrator 30 to perform a vibration process with the interval increased by a prescribed percentage in accordance with the difference between the target value and the current alertness level. As a relaxation stimulus, for example, the stimulus generation unit 193 causes the seat vibrator 30 to perform a vibration process with the interval decreased by a prescribed percentage in accordance with the difference between the target value and the current alertness level.

The alertness level determination unit 194 determines whether or not the driver's alertness level has reached the target value of the alertness level decided on by the target value decision unit 191 according to a process in which the stimulus generation unit 193 generates a guidance stimulus.

The destination information acquisition unit 195 acquires destination information (information including the name of the destination and its position information) from the destination information storage unit 171 or from the navigation device 34 via the in-vehicle network 36.

The proficiency level decision unit 196 acquires information about whether or not the driver is a driving beginner from the driver information storage unit 172 and decides on whether or not the driver is a driving beginner. For example, the proficiency level decision unit 196 may decide on whether or not the driver is a driving beginner from information of the traveling state or the movement trajectory of the driver for a previous prescribed period of time stored in the traveling state storage unit 173.

The traveling state recording unit 197 causes the traveling state storage unit 173 to store information about the traveling state. The information about the traveling state is, for example, information of the vehicle sensor 20 and/or information of the movement trajectory for a prescribed period of time. The traveling state recording unit 197 acquires information such as a speed, acceleration, a yaw rate, an accelerator opening degree, a brake operation amount, a steering wheel operation amount, a correction steering angle, and a steering angle speed from the vehicle sensor 20 via the in-vehicle network 36, and causes the traveling state storage unit 173 to store the acquired information. The traveling state recording unit 197 acquires information indicating a change over time in the position of the host vehicle M from the position information detection unit 16, the navigation device 34, or the like and causes the traveling state storage unit 173 to store the acquired information as information of the movement trajectory.

The date information acquisition unit 198 acquires information about the date and the day of the week from the control unit 19 of the biological state guidance device 10. The date information acquisition unit 198 acquires information about the driver's calendar such as work days and holidays from the driver information storage unit 172 or from the portable terminal 38 and/or the wearable terminal 40.

The fatigue level estimation unit 199 estimates a fatigue level of the driver. Specifically, for example, the fatigue level estimation unit 199 acquires information about the driver's calendar such as the work days and holidays from the driver information storage unit 172 and estimates that the driver is in a fatigued state when the working days are continuous. For example, the fatigue level estimation unit 199 acquires the driver's recent sleep data information from the driver information storage unit 172 and estimates that the driver is in a fatigued state when the sleep time is short (when the sleep time is less than or equal to a prescribed value). For example, the fatigue level estimation unit 199 acquires the driver's driving time information from the driver information storage unit 172 and estimates that the driver is in a fatigued state when the driving time is long (when the driving time is greater than or equal to a prescribed value). The fatigue level estimation unit 199 may acquire the information from the portable terminal 38, the wearable terminal 40, and the navigation device 34.

<Processing Flow>

Figure 4:
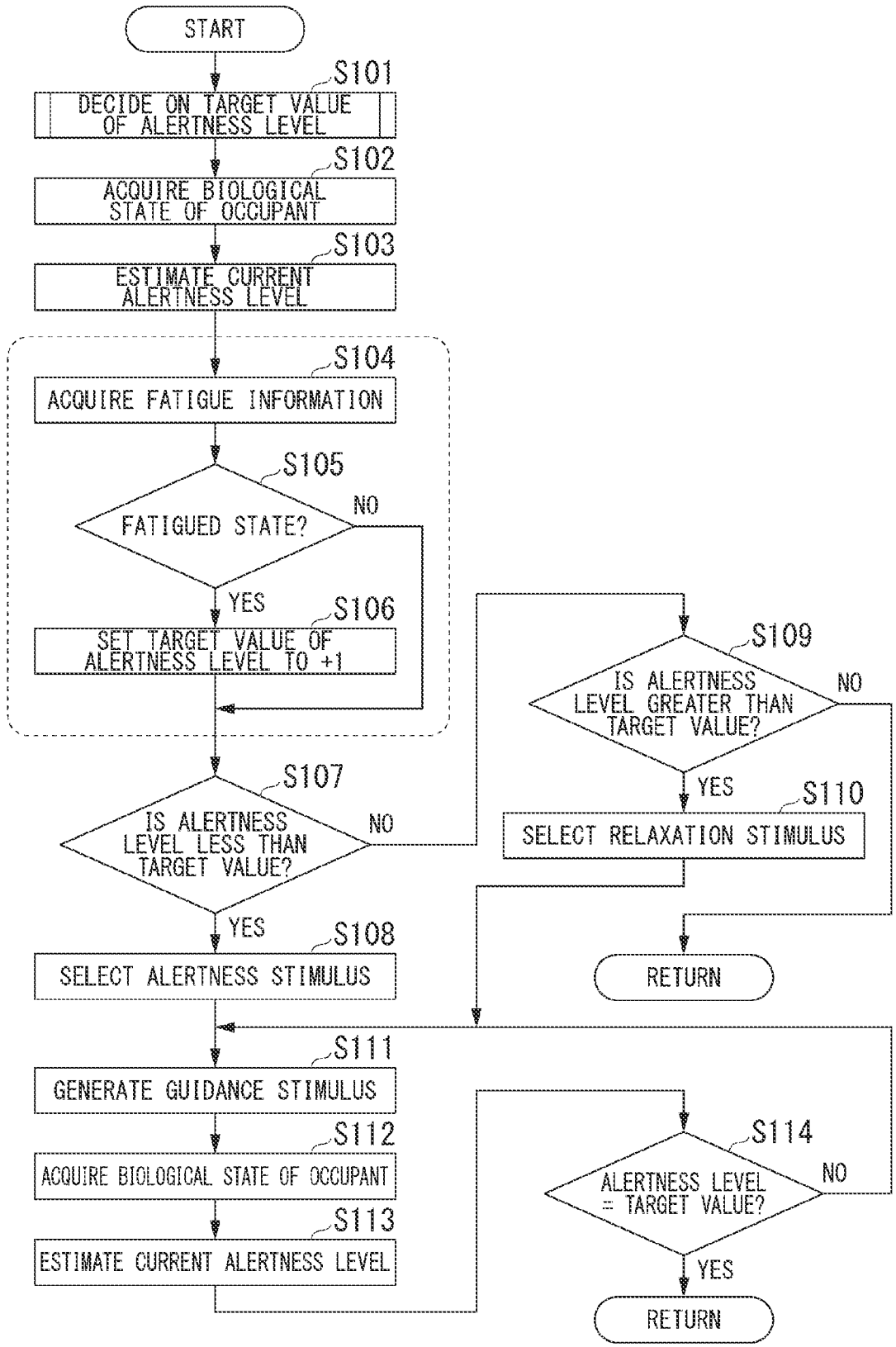
FIG. 4 is a flowchart showing an example of a flow of a biofeedback process of the biological state guidance device.

FIG. 4 is a flowchart showing an example of a flow of a process of "biofeedback" of the biological state guidance device 10. The process of FIG. 4 is iteratively executed at a prescribed interval. In the first embodiment, the target value decision unit 191 sets the target value of the alertness level related to the driver's biological state to "2" corresponding to "neutral."

First, the target value decision unit 191 sets the target value of the alertness level related to the driver's biological state to "2" corresponding to "neutral" (step S101).

Subsequently, the biological state estimation unit 192 acquires information about the biological state or information regarded as being related to the biological state from the heart rate sensor 24, the sweat sensor 26, the body temperature sensor 28, the in-vehicle camera 22, the various types of vehicle sensors 20, and/or the wearable terminal 40 (step S102).

Subsequently, the biological state estimation unit 192 estimates the alertness level related to the driver's biological state from information about the acquired biological state (step S103). The alertness level is estimated in six levels, for example, as shown in FIG. 3.

Subsequently, the fatigue level estimation unit 199 acquires fatigue-related information such as information about the driver's work days and holidays, information of the driver's recent sleep data, and information of the driver's driving time (step S104).

Subsequently, the fatigue level estimation unit 199 determines whether or not the driver is in a fatigued state on the basis of the acquired information about the driver's fatigue (step S105). When the fatigue level estimation unit 199 determines that the driver is in a fatigued state (Yes in step S105), the driver's alertness level has, for example, +1 (step S106). On the other hand, the fatigue level estimation unit 199 does nothing when it is determined that the driver is not in a fatigued state.

Subsequently, the stimulus generation unit 193 determines whether or not the driver's alertness level is less than the target value (step S107). When the driver's alertness level is less than the target value (Yes in step S107), the stimulus generation unit 193 selects an alertness stimulus (step S108). On the other hand, when the driver's alertness level is not less than the target value, the stimulus generation unit 193 determines whether or not the driver's alertness level is greater than the target value (step S109). When the driver's alertness level is greater than the target value (Yes in step S109), the stimulus generation unit 193 selects a relaxation stimulus (step S110). On the other hand, when the driver's alertness level is the same as the target value, the control unit 19 of the biological state guidance device 10 ends the process.

Subsequently, the stimulus generation unit 193 generates a guidance stimulus to stimulate the driver (step S111). When the music of the audio device 32 is used as the stimulus, the alertness stimulus is to play music having a high BPM rate or play music with a BPM rate or a pitch increased by a prescribed percentage in accordance with a difference between the target value and the current alertness level. The relaxation stimulus is to play music having a low BPM rate or play music with a BPM rate or a pitch decreased by a prescribed percentage in accordance with a difference between the target value and the current alertness level. When the vibration of the seat by the seat vibrator 30 is used as the stimulus, the alertness stimulus is, for example, to cause the seat vibrator 30 to perform a vibration process with the interval increased by a prescribed percentage in accordance with the difference between the target value and the current alertness level. The relaxation stimulus is, for example, to cause the seat vibrator 30 to perform a vibration process with the interval decreased by a prescribed percentage in accordance with the difference between the target value and the current alertness level. Subsequently, the biological state estimation unit 192 re-acquires information about the biological state or information regarded as being related to the biological state from the heart rate sensor 24, the sweat sensor 26, the body temperature sensor 28, the in-vehicle camera 22, the various types of vehicle sensors 20, and/or the wearable terminal 40 (step S112).

Subsequently, the biological state estimation unit 192 re-estimates the alertness level related to the driver's biological state from the acquired information about the biological state (step S113). The alertness level is estimated in six levels, for example, as shown in FIG. 3. This re-estimated driver's alertness level is expected to be close to the target value of the alertness level according to the guidance stimulus.

Subsequently, the alertness level determination unit 194 determines whether or not the driver's alertness level is equal to the target value of the alertness level (step S114). When the driver's alertness level is not equal to the target value of the alertness level, the control unit 19 of the biological state guidance device 10 transfers control to S111. When the driver's alertness level is equal to the target value of the alertness level, the control unit 19 of the biological state guidance device 10 ends the process. Accordingly, the flow of the "biofeedback" process in FIG. 4 ends.

In the above-described process, the fatigue level estimation unit 199 may not perform the processing of steps S104 to S106. The target value decision unit 191 may set the target value of the alertness level to a value other than "2" in step S101. The stimulus generation unit 193 may provide a guidance stimulus to all or some of the occupants as well as the driver in step S111.

As described above, according to the first embodiment, the target value decision unit 191 sets the target value of the alertness level, the biological state estimation unit 192 estimates the alertness level of the driver from information about the biological state, the fatigue level estimation unit 199 adjusts the alertness level from the information about fatigue, the stimulus generation unit 193 selects a guidance stimulus on the basis of the driver's alertness level and the target value and generates a guidance stimulus for the driver, the biological state estimation unit 192 re-estimates the driver's alertness level from information about the biological state, and the alertness level determination unit 194 determines whether or not the driver's alertness level has reached a target value.

Thereby, it is possible to guide the driver (occupant) to have a target biological state as the biological state (alertness level) of the driver (occupant). Because it may be easy to fall into distracted driving in a fatigued state, it is possible to guide the driver (occupant) to have a target biological state as the biological state of the driver (occupant) in consideration of the driver's fatigued state.

Second Embodiment

Figure 5:
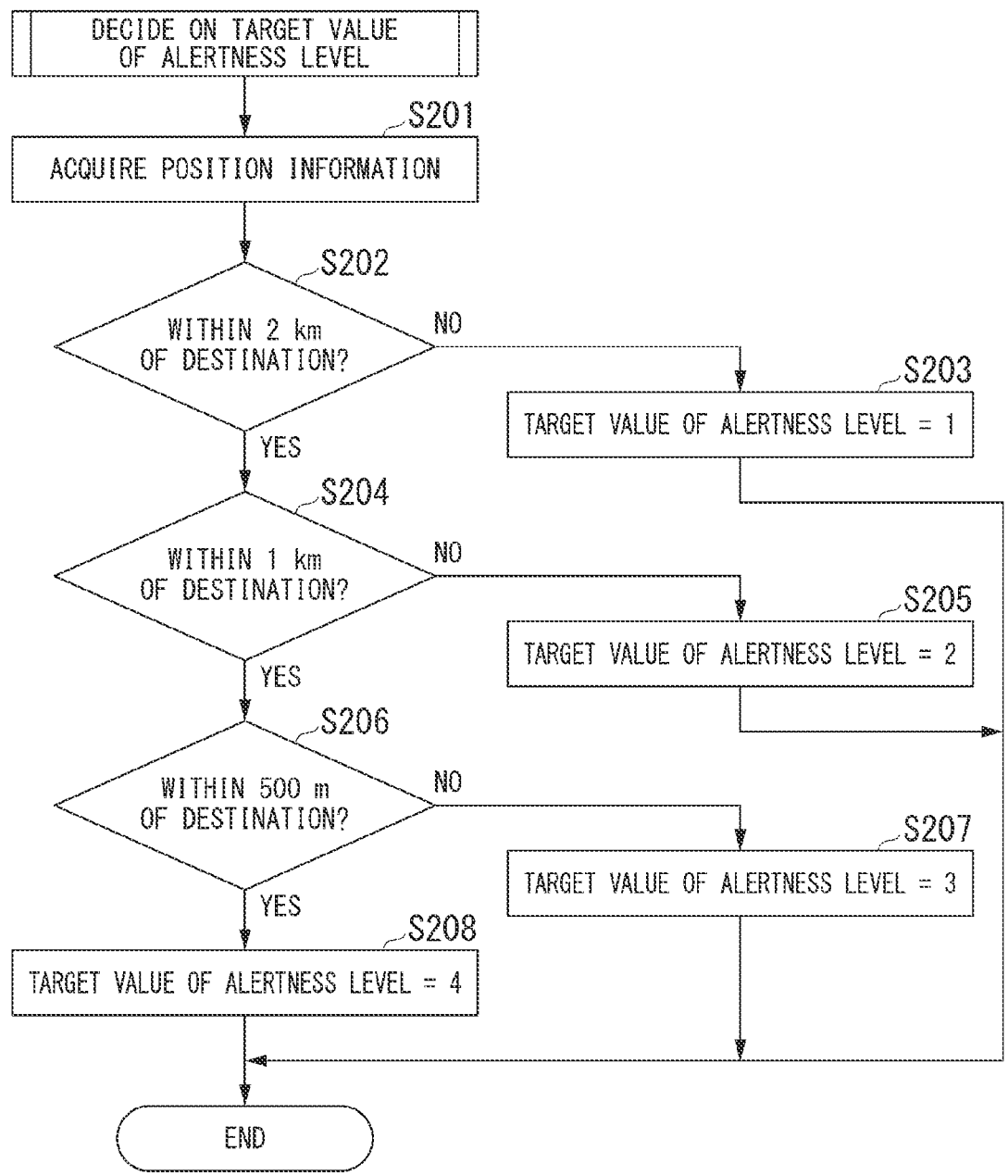
FIG. 5 is a flowchart showing an example of a flow of a process of deciding on the alertness level on the basis of position information in the biological state guidance device.

In a second embodiment, a process of deciding on the target value of the alertness level performed by the target value decision unit 191 of the biological state guidance device 10 (step S101 of FIG. 4) is different as compared with the first embodiment. FIG. 5 is a flowchart showing an example of a flow of a process of deciding on a target value of the alertness level on the basis of position information in the biological state guidance device 10 according to the second embodiment.

First, the position information detection unit 16 acquires position information of the host vehicle M (or occupant) from the GPS receiver, the navigation device 34, the portable terminal 38, the wearable terminal 40, or the like (step S201).

Subsequently, the destination information acquisition unit 195 acquires destination position information from the destination information storage unit 171 or from the navigation device 34 via the in-vehicle network 36 (step S202).

The target value decision unit 191 calculates a distance (or a route distance) to a destination from the destination position information and the position information of the host vehicle M and the like and determines whether the distance is within 2 km of the destination (step S202). When the distance is not within 2 km of the destination, the target value decision unit 191 sets the target value of the alertness level to "1" (step S203).

On the other hand, when the distance is within 2 km of the destination (Yes in step S202), the target value decision unit 191 further determines whether or not the distance is within 1 km of the destination (step S204). When the distance is not within 1 km of the destination, the target value decision unit 191 sets the target value of the alertness level to "2" (step S205).

On the other hand, when the distance is within 1 km of the destination (Yes in step S204), the target value decision unit 191 further determines whether or not the distance is within 500 m of the destination (step S206). When the distance is not within 500 m of the destination, the target value decision unit 191 sets the target value of the alertness level to "3" (step S207).

On the other hand, when the distance is within 500 m of the destination (Yes in step S206), the target value decision unit 191 sets the target value of the alertness level to "4" (step S208).

Subsequently, the control unit 19 of the biological state guidance device 10 transfers control to "biofeedback" of FIG. 4 (from step S102). Accordingly, the flow of the process of deciding on the target value of the alertness level on the basis of the position information in FIG. 5 ends. In the above-described process, the specific value of the distance is not limited to these.

According to the second embodiment, the position information detection unit 16 acquires position information of the host vehicle M or the like, the destination information acquisition unit 195 acquires destination position information, and the target value decision unit 191 calculates a distance (or a route distance) to the destination from the destination position information and the position information of the host vehicle M and the like and decides on the target value of the alertness level in accordance with the calculated distance.

Thereby, because the appropriate biological state may differ in accordance with the position of the host vehicle M, the driver (occupant) can be guided to have a biological state suitable for the position of the host vehicle M. Because the biological state can be changed according to the distance between the destination and the position of the host vehicle M, it is possible to smoothly guide the driver (occupant) to have a biological state until the driver (occupant) reaches the destination.

Third Embodiment

Figure 6:
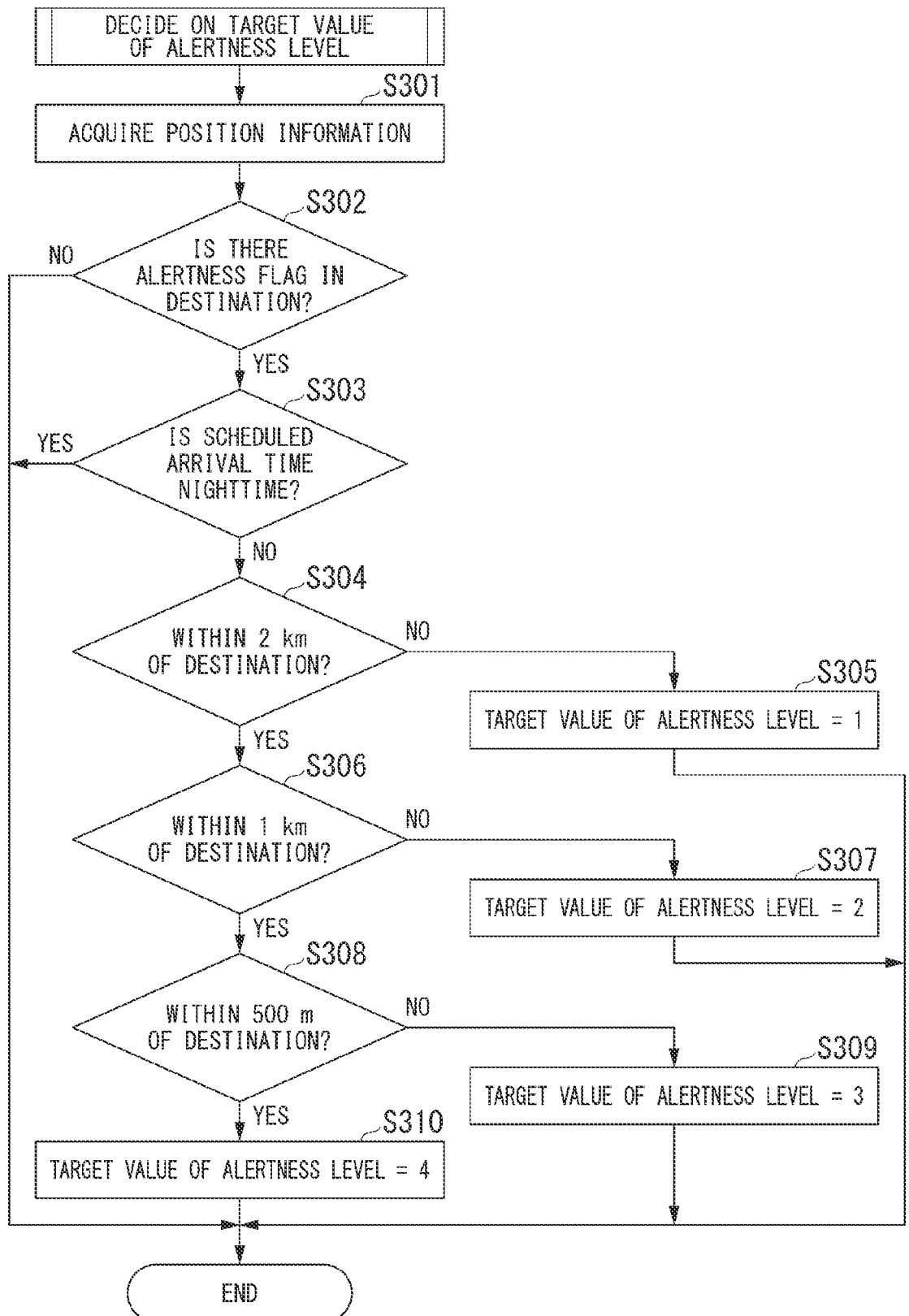
FIG. 6 is a flowchart showing an example of a flow of a process of deciding on the alertness level on the basis of a destination and time in the biological state guidance device.

In a third embodiment, a process of deciding on a target value of an alertness level performed by the target value decision unit 191 of the biological state guidance device 10 (step S101 in FIG. 4) is different as compared with the first embodiment. FIG. 6 is a flowchart showing an example of a flow of a process of deciding on the target value of the alertness level on the basis of a destination and time in the biological state guidance device 10 according to the third embodiment.

First, the position information detection unit 16 acquires position information of the host vehicle M (or an occupant)

from the GPS receiver, the navigation device 34, the portable terminal 38, the wearable terminal 40, or the like (step S301).

Subsequently, the destination information acquisition unit 195 acquires destination information 201 (a destination, an alertness flag, and a scheduled arrival time) from the destination information storage unit 171 or from the navigation device 34 via the in-vehicle network 36 (step S302).

The target value decision unit 191 determines whether or not the alertness flag of the destination is ON (step S302). When the alertness flag is OFF, the target value decision unit 191 does not perform subsequent processing.

On the other hand, when the alertness flag is ON (Yes in step S302), the target value decision unit 191 determines whether or not the scheduled arrival time of the destination is nighttime (for example, 19:00 to 03:00) (step S303). In the case of nighttime (Yes in step S303), the target value decision unit 191 does not perform subsequent processing.

On the other hand, when the scheduled arrival time is not nighttime, the target value decision unit 191 calculates a distance (or a route distance) to the destination from the destination position information and the position information of the host vehicle M, and the like and determines whether the distance is within 2 km of the destination (step S304). When the distance is not within 2 km of the destination, the target value decision unit 191 sets the target value of the alertness level to "1" (step S305).

On the other hand, when the distance is within 2 km of the destination (Yes in step S304), the target value decision unit 191 further determines whether or not the distance is within 1 km of the destination (step S306). When the distance is not within 1 km of the destination, the target value decision unit 191 sets the target value of the alertness level to "2" (step S307).

On the other hand, when the distance is within 1 km of the destination (Yes in step S306), the target value decision unit 191 further determines whether or not the distance is within 500 m of the destination (step S308). When the distance is not within 500 m of the destination, the target value decision unit 191 sets the target value of the alertness level to "3" (step S309).

On the other hand, when the distance is within 500 m of the destination (Yes in step S308), the target value decision unit 191 sets the target value of the alertness level to "4" (step S310).

Subsequently, the control unit 19 of the biological state guidance device 10 transfers control to "biofeedback" of FIG. 4 (from step S102). Accordingly, the flow of the process of deciding on the target value of the alertness level on the basis of the destination or time in FIG. 6 ends. In the above-described process, the specific value of the distance is not limited to these.

According to the third embodiment, the position information detection unit 16 acquires position information of the host vehicle M and the like, the destination information acquisition unit 195 acquires destination information, and the target value decision unit 191 calculates a distance to a destination (or a route distance) from the destination position information, the position information of the host vehicle M, and the like only when the alertness flag of the destination is ON and the scheduled arrival time is not nighttime and decides on a target value of the alertness level in accordance with the calculated distance.

Thereby, in addition to effects similar to those of the second embodiment, the ideal biological state at the time of arrival may differ according to the destination. It is possible to guide the occupant to have an appropriate biological state for each destination according to an attribute (a destination alertness flag). Furthermore, the ideal biological state at the time of arrival may differ according to the current time and the scheduled arrival time when the occupant reaches the destination. It is possible to guide the occupant to have an appropriate biological state at each time.

For example, in the destination information 201 of FIG. 2, in the first specific example, the "destination" is a "workplace," the "alertness flag" is set as "ON," and the "scheduled arrival time" is "9:00." In this case, in the process of FIG. 6, the target value of the alertness level is decided on according to the distance between the destination and the current position. In the second specific example, the "destination" is "home," the "alertness flag" is set as "OFF," and the "scheduled arrival time" is "20:00." In this case, in the process of FIG. 6, because the alertness flag of the destination is OFF, the target value of the alertness level is not set. In the third specific example, the "destination" is an "amusement park," the "alertness flag" is set as "ON," and the "scheduled arrival time" is "22:00." In this case, although the alertness flag of the destination is ON in the process of FIG. 6, the target value of the alertness level is not set because the scheduled arrival time is nighttime.

Fourth Embodiment

Figure 7:
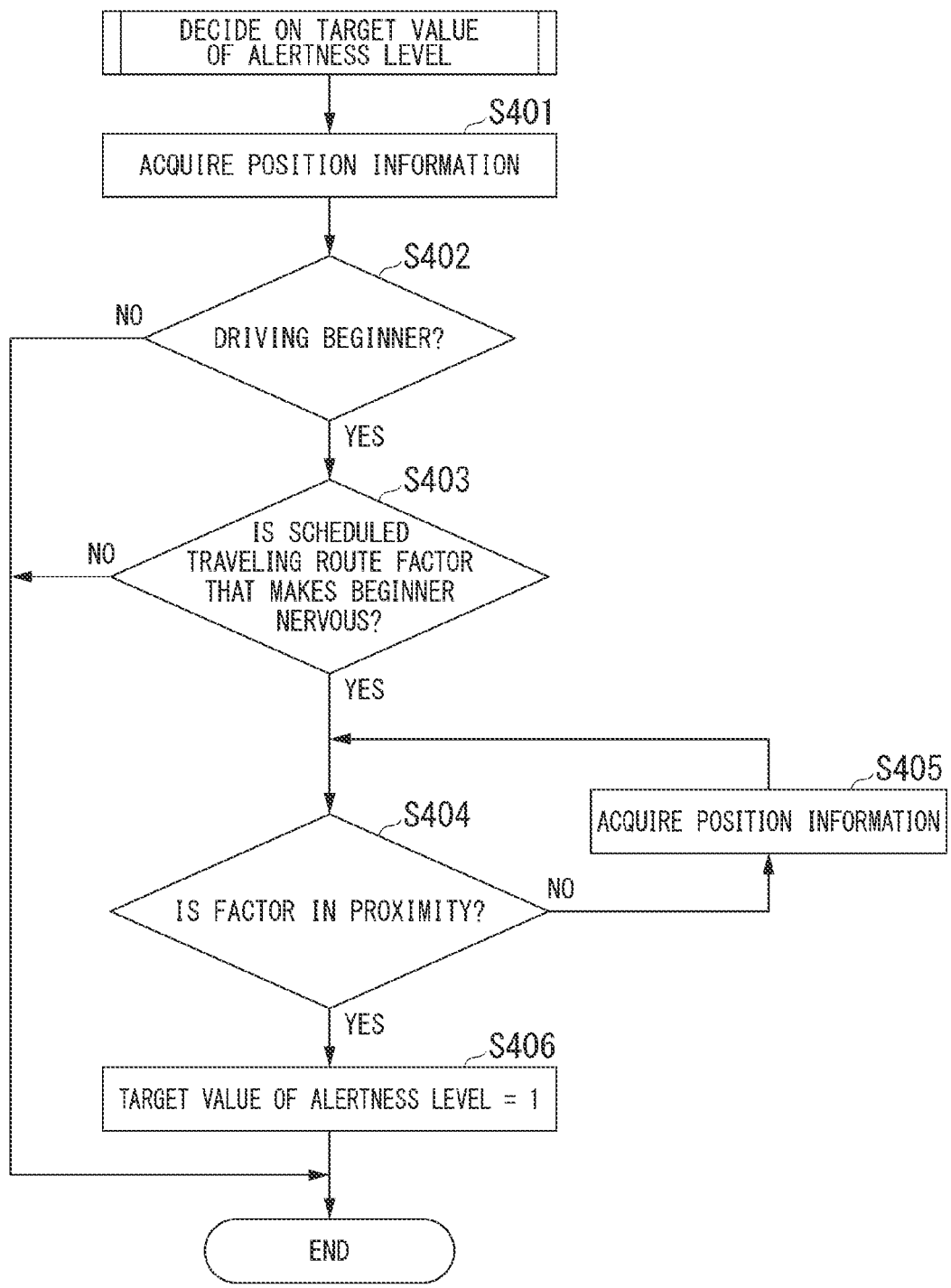
FIG. 7 is a flowchart showing an example of a flow of a process of deciding on the alertness level on the basis of a situation in the biological state guidance device.

In a fourth embodiment, a process of deciding on a target value of an alertness level performed by the target value decision unit 191 of the biological state guidance device 10 (step S101 in FIG. 4) is different as compared with the first embodiment. FIG. 7 is a flowchart showing an example of a flow of a process of deciding on the target value of the alertness level on the basis of a situation in the biological state guidance device 10 according to the fourth embodiment.

First, the position information detection unit 16 acquires position information of the host vehicle M (or the occupant) from the GPS receiver, the navigation device 34, the portable terminal 38, the wearable terminal 40, or the like (step S401).

Subsequently, the proficiency level decision unit 196 acquires information about whether or not the driver is a driving beginner from the driver information storage unit 172 and determines whether or not the driver is a driving beginner (step S402). The proficiency level decision unit 196 may determine whether or not the driver is a driving beginner from information of a traveling state and a movement trajectory of the driver for a previous prescribed period of time stored in the traveling state storage unit 173.

When the driver is not a driving beginner, the target value decision unit 191 does not perform subsequent processing. On the other hand, when the driver is a driving beginner (Yes in step S402), the target value decision unit 191 acquires a scheduled driving route from the navigation device 34, the portable terminal 38, or the wearable terminal 40 and determines whether or not there is a factor that makes the beginner nervous on the scheduled driving route (step S403). Factors that make the beginner nervous are, for example, highways, narrow streets, windings (roads with continuous curves), intersections with poor visibility, and the like.

When there is no factor that makes the beginner nervous, the target value decision unit 191 does not perform subsequent processing. On the other hand, when there is a factor that makes the beginner nervous (Yes in step S403), the target value decision unit 191 determines whether or not there is a factor in proximity (for example, at a prescribed distance such as 300 m) from the acquired position information and the information of the scheduled travel route (step S404).

When there is no factor in proximity, the position information detection unit 16 re-acquires position information, for example, after the elapse of a prescribed period of time, (step S405) and the target value decision unit 191 re-determines whether or not there is a factor in proximity (step S404). On the other hand, when there is a factor in proximity (Yes in step S404), the target value decision unit 191 sets the target value of the alertness level to, for example, "1" (step S406).

Thereafter, the control unit 19 of the biological state guidance device 10 transfers control to "biofeedback" of FIG. 4 (from step S102). Accordingly, the flow of the process of deciding on the target value of the alertness level on the basis of the situation of FIG. 7 ends.

According to the fourth embodiment, the position information detection unit 16 acquires position information of the host vehicle M or the like, the proficiency level decision unit 196 decides on whether or not the driver is a driving beginner, and the target value decision unit 191 determines whether or not there is a factor that makes the beginner nervous on the scheduled driving route if the driving is a driving beginner and sets the target value of the alertness level to, for example, "1," when there is a factor that makes the beginner nervous and when the factor is in proximity. Thereby, there may be more nervous situations when the driver is a beginner than when the driver is a normal driver, but it is possible to provide guidance for an appropriate biological state even if the driver is a beginner.

Fifth Embodiment

Figure 8:
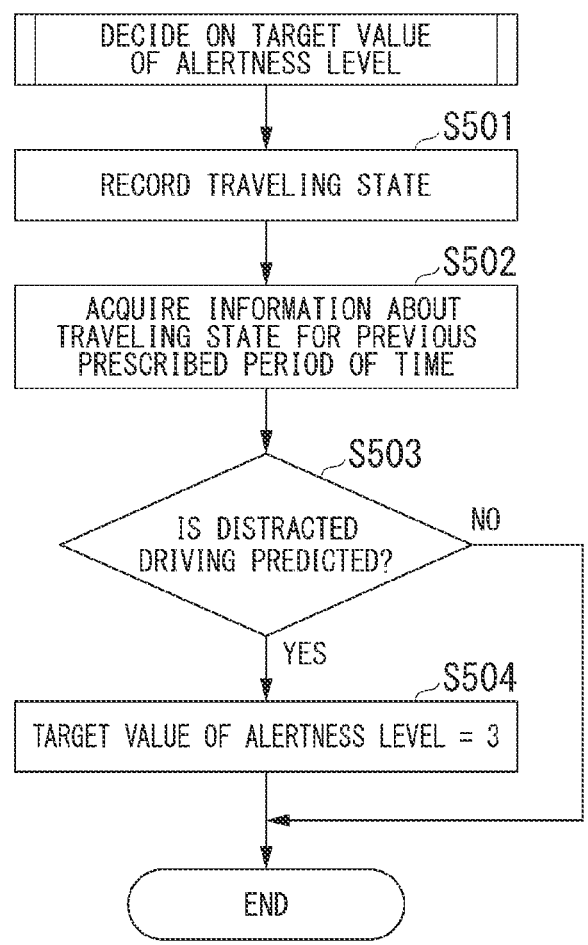
FIG. 8 is a flowchart showing an example of a flow of a process of deciding on the alertness level on the basis of a situation in the biological state guidance device.

In a fifth embodiment, a process of deciding on a target value of an alertness level performed by the target value decision unit 191 of the biological state guidance device 10 (step S101 of FIG. 4) is different as compared with the first embodiment. FIG. 8 is a flowchart showing an example of a flow of a process of deciding on the target value of the alertness level on the basis of a situation in the biological state guidance device 10 according to the fifth embodiment.

First, the traveling state recording unit 197 causes the traveling state storage unit 173 to store information about a traveling state (information of the vehicle sensor 20 or information of the movement trajectory) when the host vehicle M is traveling (step S501). Subsequently, the traveling state recording unit 197 acquires information about a traveling state for a previous prescribed period of time from the traveling state storage unit 173 (step S502).

Subsequently, the target value decision unit 191 determines whether or not the driver is expected to perform distracted driving from the information about the traveling state (step S503). The situation in which the driver is expected to perform distracted driving is, for example, a case where straight driving on a straight road is continuous, a case where traffic jams are in progress, a case of meandering driving, or the like. This situation can be determined by information from the vehicle sensor 20 and information of the movement trajectory.

When it is determined that the driver is not performing distracted driving, the target value decision unit 191 does not perform subsequent processing. On the other hand, when it is determined that the driver is performing distracted driving (Yes in step S503), the target value decision unit 191 sets the target value of the alertness level to, for example, "3" (step S504).

Subsequently, the control unit 19 of the biological state guidance device 10 transfers control to "biofeedback" of FIG. 4 (from step S102). Accordingly, the flow of the process of deciding on the target value of the alertness level on the basis of the situation of FIG. 8 ends.

In the above-described process, in steps S501 and S502, the position information detection unit 16 may acquire position information and calculate a movement trajectory on the basis of the position information.

According to the fifth embodiment, the traveling state recording unit 197 records information about a traveling state in the traveling state storage unit 173 and acquires information about the traveling state for a previous prescribed period of time and the target value decision unit 191 determines whether or not the driver is performing distracted driving and sets the target value of the alertness level to, for example, "3," when it is determined that the driver is performing distracted driving. Thereby, the current biological state may be estimated in more detail from the traveling state such as distracted driving for the previous period of time and guidance for the biological state can be provided more effectively.

Sixth Embodiment

Figure 9:
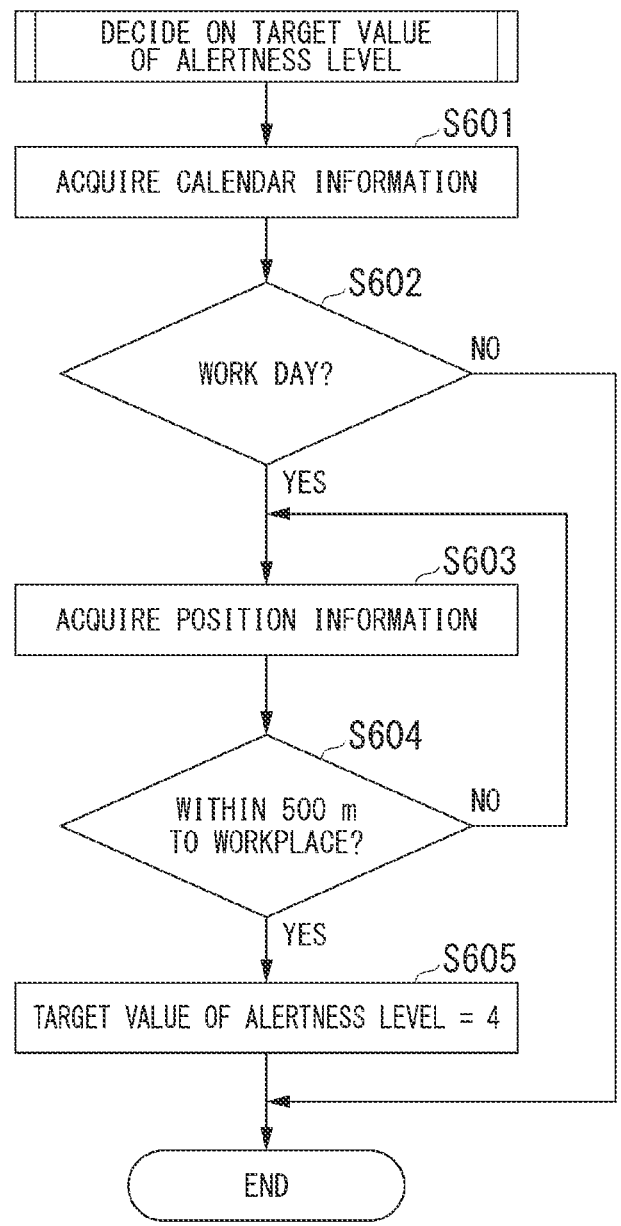
FIG. 9 is a flowchart showing an example of a flow of a process of deciding on the alertness level on the basis of a situation in the biological state guidance device.

In a sixth embodiment, a process of deciding on a target value of an alertness level performed by the target value decision unit 191 of the biological state guidance device 10 (step S101 in FIG. 4) is different as compared with the first embodiment. FIG. 9 is a flowchart showing an example of a flow of a process of deciding on the target value of the alertness level on the basis of a situation in the biological state guidance device 10 according to the sixth embodiment.

First, the date information acquisition unit 198 acquires information about the date and the day of the week from the control unit 19 of the biological state guidance device 10 or the like. The date information acquisition unit 198 acquires information about the driver's calendar such as work days and holidays from the driver information storage unit 172 or from the portable terminal 38 and the wearable terminal 40 (step S601).

Next, the target value decision unit 191 determines whether or not today is a work day (step S602). When today is not a work day, the target value decision unit 191 does not perform subsequent processing.

When today is a work day (Yes in step S602), the position information detection unit 16 acquires the position information of the host vehicle M (or the occupant) from the GPS receiver, the navigation device 34, the portable terminal 38, the wearable terminal 40, and the like (step S603).

Subsequently, the destination information acquisition unit 195 acquires destination information of the workplace and the target value decision unit 191 determines whether the distance to the workplace (or the route distance) is within a prescribed value (for example, within 500 m) on the basis of the position information of the workplace and the position information of the current position (step S604).

When the distance to the workplace is not within a prescribed value, the control unit 19 transfers control to step S603. When the distance to the workplace is within the prescribed value (Yes in step S604), the target value decision unit 191 sets the target value of the alertness level to, for example, "4" (step S605).

Subsequently, the control unit 19 of the biological state guidance device 10 transfers control to "biofeedback" of FIG. 4 (from step S102). Accordingly, the flow of the process of deciding on the target value of the alertness level on the basis of the situation of FIG. 9 ends.

In the above-described process, the "work day" or the "workplace" is not limited to this, and it is only necessary for the "work day" or the "workplace" to be anything related to a date of the calendar and a destination corresponding thereto.

According to the sixth embodiment, the date information acquisition unit 198 acquires information about the calendar, the target value decision unit 191 determines whether or not today is a work day, the position information detection unit 16 determines whether the distance to the workplace is within a prescribed value and acquires position information, and the target value decision unit 191 sets the target value of the alertness level to, for example, "4," when it is determined that the distance to the workplace is within the prescribed value. Thereby, because the ideal biological state may differ according to the date and day of the week even in the same position information, guidance for a more appropriate biological state can be provided.

Although modes for carrying out the present invention have been described above using embodiments, the present invention is not limited to the embodiments and various modifications and substitutions can also be made without departing from the scope and spirit of the present invention.

For example, the target value decision unit 191 may appropriately combine and execute processes of deciding on a target value of an alertness level. In this case, for example, the target value of the alertness level may be set to a decided maximum value or a decided minimum value.

What is claimed is:

1. A biological state guidance device comprising:
    a biological state estimation unit configured to estimate a biological state of an occupant of a vehicle;
    a target value decision unit configured to decide on a target value that is an index for setting the biological state of the occupant as a target state,
    wherein the target value corresponds to a first alertness level;
    a stimulus generation unit configured to control a stimulus generation device for generating a stimulus for guidance so that the biological state of the occupant is close to a target value on the basis of the estimated biological state and the target value; and
    a position information detection unit configured to detect position information of the vehicle; and
    a destination information acquisition unit configured to acquire destination information about a destination of the vehicle,
    wherein the target value decision unit changes the target value of the biological state to a higher alertness level as a distance based on the destination information and on the position information decreases.

2. The biological state guidance device according to claim 1,
    wherein the destination information includes an attribute corresponding to the destination, and
    wherein the target value decision unit changes the target value in accordance with the attribute.

3. The biological state guidance device according to claim 1, wherein the target value decision unit changes the target value on the basis of time information.

4. The biological state guidance device according to claim 1, further comprising a proficiency level decision unit configured to decide on a proficiency level for driving of a driver among occupants,
    wherein the target value decision unit changes the target value on the basis of the proficiency level.

5. The biological state guidance device according to claim 1, further comprising a traveling state storage unit configured to store a traveling state of a certain period,
    wherein the target value decision unit changes the target value on the basis of the traveling state.

6. The biological state guidance device according to claim 1, further comprising a date information acquisition unit configured to acquire date or day-of-week information,
    wherein the target value decision unit changes the target value on the basis of the date or day-of-week information.

7. The biological state guidance device according to claim 1, further comprising a fatigue level estimation unit configured to estimate a fatigue level of the occupant,
    wherein the target value decision unit changes the target value on the basis of the fatigue level.

8. A biological state guidance method comprising:
    detecting, by an in-vehicle computer, position information of a vehicle;
    estimating, by the in-vehicle computer, a biological state of an occupant of the vehicle;
    controlling, by the in-vehicle computer, a stimulus generation device for generating a stimulus for guidance so that the biological state of the occupant is close to a target value on the basis of the estimated biological state and the target value,
    wherein the target value corresponds to a first alertness level;
    acquiring, by the in-vehicle computer, a destination information acquisition unit configured to acquire destination information about a destination of the vehicle; and
    changing, by the in-vehicle computer, the target value of the biological state to a higher alertness level as a distance based on the destination information and on the position information decreases.

9. A computer-readable non-transitory storage medium storing a program for causing an in-vehicle computer to:
    detect position information of a vehicle;
    estimate a biological state of an occupant of the vehicle;
    control a stimulus generation device for generating a stimulus for guidance so that the biological state of the occupant is close to a target value on the basis of the estimated biological state and the target value,
    wherein the target value corresponds to a first alertness level;
    acquire destination information about a destination of the vehicle; and
    change the target value of the biological state to a higher alertness level as a distance based on the destination information and on the position information decreases.

10. A biological state guidance device comprising:
    a biological state estimation unit configured to estimate a biological state of an occupant of a vehicle;
    a target value decision unit configured to decide on a target value that is an index for setting the biological state of the occupant as a target state;
    a stimulus generation unit configured to control a stimulus generation device for generating a stimulus for guidance so that the biological state of the occupant is close to a target value on the basis of the estimated biological state and the target value; and
    a position information detection unit configured to detect position information of the vehicle,
    wherein the target value decision unit decides on the target value on the basis of the position information when an alertness flag indicating whether or not the occupant is active at a time of arrival at a destination of the vehicle is set to an ON value with respect to the destination of the vehicle, and a scheduled time of arrival at the destination is not nighttime.

* * * * *